United States Patent
Dandapure et al.

(10) Patent No.: US 12,330,014 B2
(45) Date of Patent: *Jun. 17, 2025

(54) EXERCISE MAT

(71) Applicant: LULULEMON ATHLETICA CANADA INC., Vancouver (CA)

(72) Inventors: Yogendra V. Dandapure, Richmond (CA); Katherine Douglas, Vancouver (CA); Glenn Malcolm Boghosian, Santa Fe Springs, CA (US); Chen I. Kao, Dacun Township (TW)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 48 days.

This patent is subject to a terminal disclaimer.

(21) Appl. No.: 18/165,705

(22) Filed: Feb. 7, 2023

(65) Prior Publication Data

US 2023/0173334 A1 Jun. 8, 2023

Related U.S. Application Data

(63) Continuation of application No. 15/847,475, filed on Dec. 19, 2017, now Pat. No. 11,623,116, which is a continuation of application No. 13/427,615, filed on Mar. 22, 2012, now Pat. No. 9,902,125.

(60) Provisional application No. 61/467,233, filed on Mar. 24, 2011.

(51) Int. Cl.
*A63B 21/00* (2006.01)
*A63B 6/00* (2006.01)

(52) U.S. Cl.
CPC .......... *A63B 21/4037* (2015.10); *A63B 6/00* (2013.01); *A63B 2209/00* (2013.01)

(58) Field of Classification Search
CPC ... A63B 21/4037; A63B 6/00; A63B 2209/00; A47C 7/021; A47C 27/15; A47C 27/16; A47G 27/0218; A47G 2009/1018
See application file for complete search history.

(56) References Cited

U.S. PATENT DOCUMENTS

| 1,872,846 | A | * | 8/1932 | Thiele | A47G 27/0412 16/8 |
|---|---|---|---|---|---|
| D103,647 | S | | 3/1937 | Vorhauer | |
| D172,314 | S | | 5/1954 | Saidel | |
| 3,110,042 | A | * | 11/1963 | Slemmons | A47C 27/148 5/727 |
| 3,517,407 | A | | 6/1970 | Wyant | |

(Continued)

FOREIGN PATENT DOCUMENTS

| CA | 2772362 A1 | 9/2012 |
|---|---|---|
| CN | 2095684 U | 2/1992 |

(Continued)

OTHER PUBLICATIONS

Allowance Decision of Re-Examination of Taiwan Application No. TW110114659, mailed Jan. 5, 2023, 3 Pages, (with English language translation).

(Continued)

*Primary Examiner* — Eric J Kurilla

(57) ABSTRACT

An exercise mat comprising: at least one top layer comprising polyurethane, at least one bottom layer, and at least one middle layer disposed between the at least one top layer and the at least one bottom layer.

19 Claims, 3 Drawing Sheets

(56) References Cited

U.S. PATENT DOCUMENTS

| | | | |
|---|---|---|---|
| 3,634,895 A | 1/1972 | Childers | |
| 4,137,583 A | 2/1979 | Baldwin et al. | |
| 4,147,828 A | 4/1979 | Heckel et al. | |
| 4,326,006 A | 4/1982 | Kaminstein | |
| 4,516,668 A | 5/1985 | Grayek | |
| 4,574,101 A | 3/1986 | Tricca et al. | |
| 4,777,681 A | 10/1988 | Luck et al. | |
| 4,925,724 A | 5/1990 | Ogden | |
| 5,260,123 A | 11/1993 | Hergenrother et al. | |
| 5,562,573 A | 10/1996 | Harinishi | |
| 5,607,745 A | 3/1997 | Ogden | |
| 5,714,229 A * | 2/1998 | Ogden | B32B 3/266 |
| | | | 428/116 |
| D411,400 S | 6/1999 | Yancey, Jr. | |
| 5,910,544 A | 6/1999 | Ozawa et al. | |
| 6,114,014 A | 9/2000 | Ikeda et al. | |
| 6,321,401 B1 | 11/2001 | Fleming et al. | |
| D454,255 S | 3/2002 | Walther et al. | |
| 6,446,289 B1 | 9/2002 | Su et al. | |
| 6,524,712 B1 | 2/2003 | Schledjewski et al. | |
| 6,528,472 B2 | 3/2003 | Charaf et al. | |
| 6,774,067 B2 | 8/2004 | DeMott et al. | |
| 6,901,615 B1 | 6/2005 | Lombardo et al. | |
| 6,935,273 B2 | 8/2005 | Throndsen et al. | |
| 7,137,157 B2 | 11/2006 | Nichols | |
| D536,531 S | 2/2007 | Nannini | |
| D552,397 S | 10/2007 | Van Patten | |
| D557,051 S | 12/2007 | Adoboe | |
| D565,883 S | 4/2008 | Gupta | |
| D587,460 S | 3/2009 | Ferragamo | |
| D594,554 S | 6/2009 | Rinaldi et al. | |
| D611,714 S | 3/2010 | Norman et al. | |
| 7,682,680 B2 | 3/2010 | McMahan | |
| D648,943 S | 11/2011 | Mason et al. | |
| D653,894 S | 2/2012 | Kieffer | |
| D657,838 S | 4/2012 | Oldknow | |
| D679,532 S | 4/2013 | Douglas et al. | |
| 8,512,854 B2 * | 8/2013 | Fox | B32B 5/245 |
| | | | 428/319.3 |
| 8,652,624 B2 | 2/2014 | Subramanian et al. | |
| 9,902,125 B2 | 2/2018 | Dandapure et al. | |
| 11,007,402 B2 * | 5/2021 | Armitage | A63B 21/4037 |
| 11,623,116 B2 * | 4/2023 | Dandapure | B32B 5/024 |
| | | | 977/788 |
| 2001/0044249 A1 | 11/2001 | Demott et al. | |
| 2002/0006516 A1 | 1/2002 | Ito et al. | |
| 2002/0111282 A1 | 8/2002 | Charaf et al. | |
| 2002/0183441 A1 | 12/2002 | Morikawa et al. | |
| 2003/0015282 A1 | 1/2003 | Reisdorf et al. | |
| 2003/0106152 A1 | 6/2003 | Hart et al. | |
| 2004/0016054 A1 | 1/2004 | Reynolds | |
| 2004/0033741 A1 | 2/2004 | Peng | |
| 2004/0109992 A1 | 6/2004 | Gribble et al. | |
| 2004/0122192 A1 | 6/2004 | Imuta et al. | |
| 2004/0237194 A1 | 12/2004 | McMahan | |
| 2004/0250346 A1 | 12/2004 | Vasishth | |
| 2005/0003173 A1 | 1/2005 | Nichols | |
| 2005/0031827 A1 | 2/2005 | Lang et al. | |
| 2005/0053746 A1 | 3/2005 | Bartek | |
| 2005/0085592 A1 | 4/2005 | Taniguchi et al. | |
| 2005/0161155 A1 | 7/2005 | Kent | |
| 2006/0051537 A1 | 3/2006 | Katayama et al. | |
| 2006/0154038 A1 | 7/2006 | Kanae et al. | |
| 2007/0066467 A1 | 3/2007 | Edwards | |
| 2007/0071941 A1 | 3/2007 | Eleazer et al. | |
| 2007/0071942 A1 | 3/2007 | Callaway et al. | |
| 2007/0194482 A1 | 8/2007 | Douglas et al. | |
| 2007/0276092 A1 | 11/2007 | Kanae et al. | |
| 2008/0078028 A1 | 4/2008 | McMahan | |
| 2008/0188600 A1 | 8/2008 | Westwood et al. | |
| 2008/0216235 A1 | 9/2008 | Hsu Tang | |
| 2008/0229500 A1 | 9/2008 | Lin | |
| 2008/0254281 A1 | 10/2008 | Chen et al. | |
| 2008/0307583 A1 | 12/2008 | Oh | |
| 2009/0070932 A1 | 3/2009 | Min | |
| 2009/0110867 A1 | 4/2009 | Feng Shen | |
| 2009/0119836 A1 | 5/2009 | Sharp | |
| 2009/0142551 A1 | 6/2009 | Fox et al. | |
| 2009/0276957 A1 | 11/2009 | Boitet-Ball | |
| 2009/0297811 A1 | 12/2009 | Hutchinson | |
| 2010/0129481 A1 | 5/2010 | Jeong | |
| 2010/0173124 A1 | 7/2010 | Liu | |
| 2010/0260963 A1 | 10/2010 | Feng Shen | |
| 2010/0267535 A1 | 10/2010 | Kieffer | |
| 2011/0059293 A1 | 3/2011 | Powell et al. | |
| 2011/0092930 A1 | 4/2011 | Poorman | |
| 2011/0118404 A1 | 5/2011 | Jung et al. | |
| 2011/0233184 A1 | 9/2011 | Bouix et al. | |
| 2011/0300189 A1 | 12/2011 | Davis | |
| 2012/0011656 A1 * | 1/2012 | Daly | A47C 27/084 |
| | | | 5/655.9 |
| 2012/0015176 A1 | 1/2012 | Riebel et al. | |
| 2012/0076981 A1 | 3/2012 | Franks et al. | |
| 2012/0124739 A1 | 5/2012 | Crowne et al. | |
| 2012/0124740 A1 | 5/2012 | Castle | |
| 2012/0227181 A1 | 9/2012 | Cintas et al. | |
| 2012/0240336 A1 | 9/2012 | Dandapure et al. | |
| 2013/0042408 A1 | 2/2013 | Sun | |
| 2013/0061393 A1 | 3/2013 | Silverman | |
| 2013/0086744 A1 | 4/2013 | Silverman | |
| 2013/0153081 A1 | 6/2013 | Garbarino | |
| 2013/0171432 A1 | 7/2013 | Dandapure et al. | |
| 2013/0251963 A1 * | 9/2013 | Dandapure | B32B 3/10 |
| | | | 428/197 |
| 2014/0134357 A1 | 5/2014 | Kobayashi et al. | |
| 2014/0162079 A1 * | 6/2014 | Subramanian | B32B 25/08 |
| | | | 428/519 |
| 2018/0126692 A1 | 5/2018 | Dandapure et al. | |

FOREIGN PATENT DOCUMENTS

| | | |
|---|---|---|
| CN | 201015685 Y | 2/2008 |
| CN | 101190366 A | 6/2008 |
| CN | 101909882 A | 12/2010 |
| EP | 0589747 A1 | 3/1994 |
| EP | 2505483 A2 | 10/2012 |
| GB | 1443600 A | 7/1976 |
| JP | S423011 B1 | 2/1942 |
| JP | S5573544 A | 6/1980 |
| JP | H028463 U | 1/1990 |
| JP | 2001253913 A | 9/2001 |
| JP | 2002167413 A | 6/2002 |
| JP | 2006508836 A | 3/2006 |
| JP | 3146951 U | 12/2008 |
| JP | 2010148763 A | 7/2010 |
| KR | 101016795 B1 | 2/2011 |
| TW | 588085 B | 5/2004 |
| TW | 200530311 A | 9/2005 |
| TW | 200821123 A | 5/2008 |
| TW | I301796 B | 10/2008 |
| TW | 200916156 A | 4/2009 |
| TW | I347335 B | 8/2011 |
| WO | 9314927 A1 | 8/1993 |
| WO | 9846670 A1 | 10/1998 |
| WO | 03068836 A1 | 8/2003 |
| WO | 2004053223 A2 | 6/2004 |
| WO | 2009064692 A1 | 5/2009 |
| WO | 2010050658 A1 | 5/2010 |

OTHER PUBLICATIONS

Extended European Search Report for European Application No. 12161139.6, mailed Feb. 7, 2013, 15 Pages.
Extended European Search Report for European Application No. 12863549.7, mailed May 28, 2015, 07 Pages.
U.S. Appl. No. 13/728,221.
U.S. Appl. No. 13/843,115.
International Preliminary Report on Patentability for International Application No. PCT/CA2012/001192, mailed Jul. 10, 2014, 7 Pages.

(56) References Cited

OTHER PUBLICATIONS

International Search Report and Written Opinion for International Application No. PCT/CA2012/001192, mailed Mar. 14, 2013, 8 Pages.
Office Action for Australian Application No. 2012201690, mailed Oct. 22, 2014, 4 Pages.
Office Action for Canadian Application No. 2,772,362, mailed Apr. 10, 2018, 4 Pages.
Office Action for Canadian Application No. 3,047,443, mailed Jul. 5, 2022, 3 Pages.
Office Action for Canadian Application No. 3,047,443, mailed Apr. 16, 2021, 5 Pages.
Office Action for Canadian Application No. 3,047,443, mailed Sep. 18, 2020, 5 Pages.
Office Action for Chinese Application No. 201210082580.4, mailed Aug. 1, 2016, 16 Pages, (with English language translation).
Office Action for Chinese Application No. 201210082580.4, mailed Jul. 4, 2017, 13 Pages, (with English language translation).
Office Action for Chinese Application No. 201210082580.4, mailed Apr. 10, 2015, 16 Pages, (with English language translation).
Office Action for Chinese Application No. 201210082580.4, mailed Sep. 10, 2018, 8 Pages, (with English language translation).
Office Action for Chinese Application No. 201210082580.4, mailed Apr. 24, 2018, 10 Pages, (with English language translation).
Office Action for Chinese Application No. 201210082580.4, mailed Feb. 28, 2019, 13 Pages, (with English language translation).
Office Action for Chinese Application No. 201280065105.4, mailed Jul. 1, 2015, 15 Pages, (with English language translation).
Office Action for Chinese Application No. 201910452576.4, mailed Jan. 6, 2021, 6 Pages.
Office Action for Chinese Application No. 201910452576.4, mailed Jan. 20, 2020, 8 Pages.
Office Action for Chinese Application No. 201910452576.4, mailed Jul. 23, 2020, 08 Pages.
Office Action for Chinese Application No. CN201210082580.4, mailed Jan. 22, 2017, 14 Pages, (with English language translation).
Office Action for Chinese Patent Application No. 201910452576.4, mailed Apr. 17, 2023, 9 Pages.
Office Action for European Application No. 12161139.6, mailed Jul. 1, 2016, 5 Pages.
Office Action for European Application No. 12161139.6, mailed Mar. 30, 2017, 1 Page.
Office Action for Japanese Application No. JP2012069159, mailed Nov. 29, 2016, 10 Pages, (with English language translation).
Office Action for Taiwan Application No. 101110157, mailed Nov. 9, 2017, 20 Pages, (with English language translation).
Office Action for Taiwan Application No. 101110157, mailed Jul. 23, 2018, 20 Pages, (with English language translation).
Office Action for Taiwan Application No. 101110157, mailed Jun. 24, 2016, 20 Pages, (with English language translation).
Office Action for Taiwan Patent Application No. 108102768, mailed Jan. 25, 2021, 23 Pages, (with English language translation).
Office Action for Taiwan Patent Application No. 110114659, mailed Jun. 24, 2022, 07 Pages.
Partial European Search Report for European Application No. EP12161139, mailed Jun. 18, 2012, 6 Pages.
Slavin H., "Ionic Silver—The Powerful Defense Against Viruses And Other Microbes," Health Freedom News, Summer 2006, vol. 24, No. 3, p. 22+, 7 Pages.
Walters P.A., et al., "Algicidal Activity of a Surface-Bonded Organosilicon Quaternary Ammonium Chloride," Applied and Environmental Microbiology, Feb. 1973, vol. 25, No. 2, pp. 253-256.
Zhu P., "Classification of Antibacterial Finishing Agents," Functional Fibers and Functional Textiles, Aug. 31, 2006, pp. 44,46.
Office Action for Taiwan Patent Application No. 110114659, mailed Jan. 5, 2023, 23 Pages, (with English language translation).

* cited by examiner

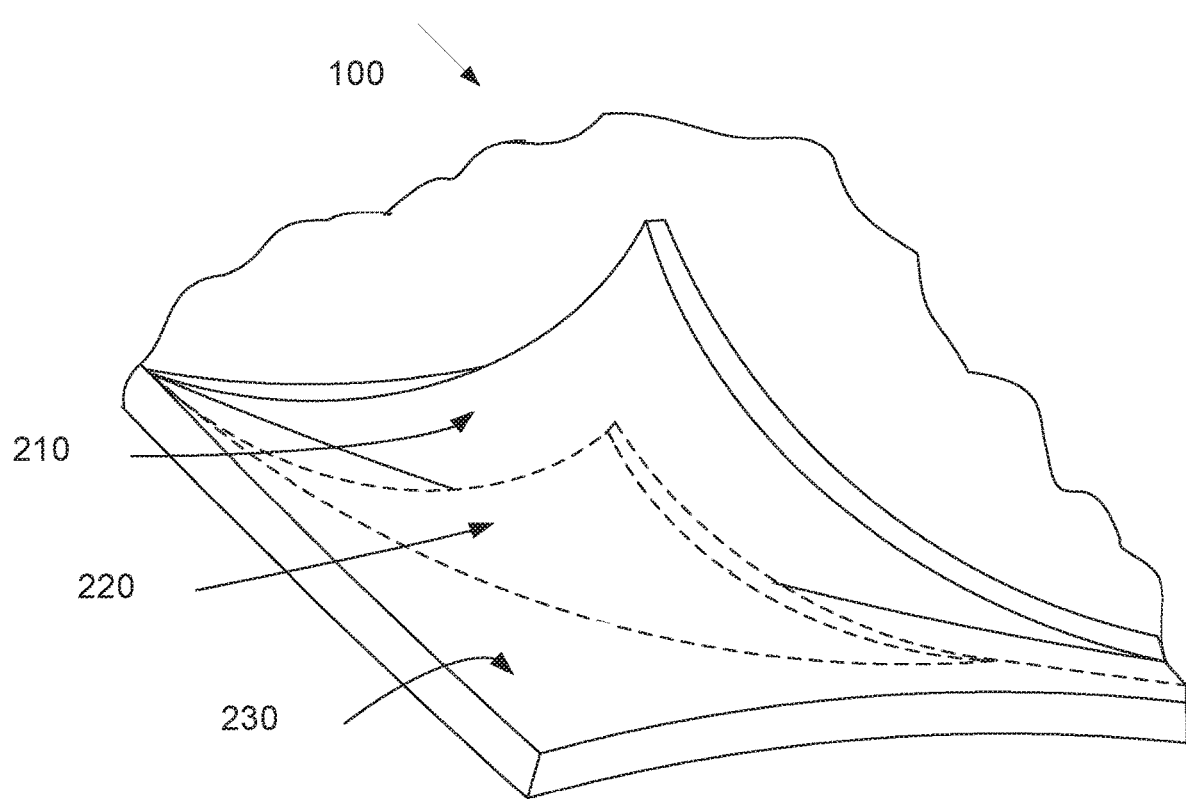

EXERCISE MAT

CROSS REFERENCE TO RELATED APPLICATIONS

This application is a continuation application of U.S. application Ser. No. 15/847,475, which was filed on Dec. 19, 2017, which is a continuation application of U.S. application Ser. No. 13/427,615, which was filed on Mar. 22, 2012 (now U.S. Pat. No. 9,902,125), which claims the benefit of U.S. Provisional Patent Application No. 61/467,233, filed Mar. 24, 2011. All applications are incorporated by reference in their entirety for all purposes.

BRIEF DESCRIPTION OF THE DRAWINGS

FIGS. 2-3 depict embodiments of an exercise mat with three structural layers, according to one embodiment of the present invention.

DESCRIPTION OF EMBODIMENTS OF THE INVENTION

Figure 1A:
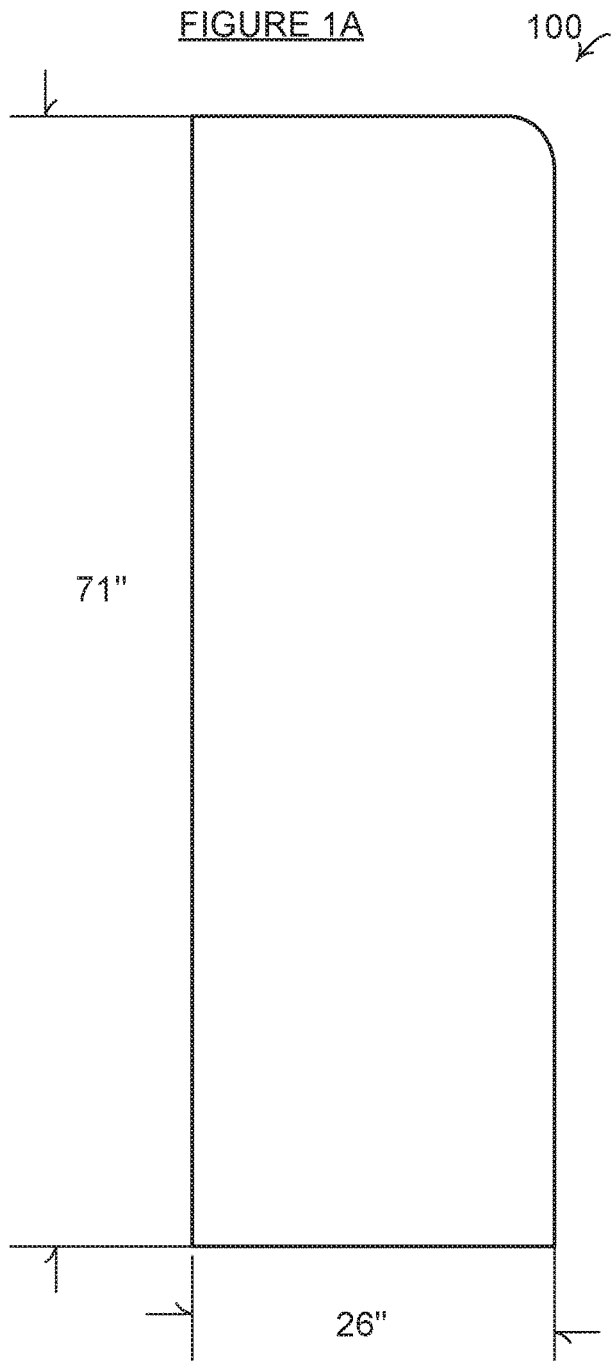
FIG. 1A depicts a top-down view of an exercise mat, according to an embodiment of the present invention.
Figure 1B:
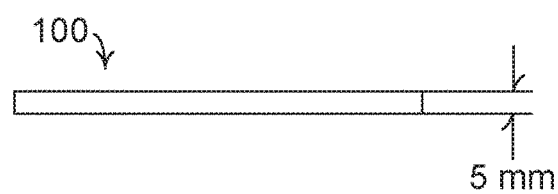
FIG. 1B depicts a side view of an exercise mat, according to an embodiment of the present invention.

FIGS. 1A and 1B depict an exercise mat 100, according to an embodiment of the present invention. The exercise mat 100 may be placed on a flat surface by a user to provide cushioning, grip, support, or stability, or any combination thereof, allowing the user to more easily and effectively perform yoga or other exercises. The exercise mat 100 can comprise several layers of varying materials and structures disposed atop one another. FIG. 1A is a top view of the exercise mat 100. This view depicts a rectangular exercise mat 100 of sufficient size to support a typical user's body through a wide range of yoga positions. Example sizes may include, but are not limited to, widths of 26 inches to 30 inches and lengths of 70 inches to 78 inches. Although a rectangular exercise mat 100 is shown in FIG. 1A, it should be noted that the exercise mat 100 may have other shapes, such as a square, circle, or oval, or any other shape or design.

FIG. 1B is a side view of the exercise mat 100. As illustrated in FIG. 1B, the thickness of the exercise mat 100 can be significantly less than its length and width. Example thicknesses may include, but are not limited to, thicknesses of 2.0 mm to 7.0 mm.

FIG. 2 is a view of an exercise mat 100 with three layers, according to one embodiment of the present invention. The three layers are separated in FIG. 2 to illustrate their arrangement. It should be noted that although three layers are explained with respect to FIG. 2, in some embodiments only one or two of the layers may be used. In addition, in some embodiments, additional layers may be added to the one, two, or three layers that are pictured.

The exercise mat 100 can comprise a top layer 210. In some embodiments, the top layer 210 can have an open cell structure. This structure can allow the top layer 210 to absorb or wick away moisture, keeping the top layer 210 dry during exercise. The top layer 210 may provide a level of friction that gives sufficient grip (e.g., in wet and/or dry conditions) to a user without restricting the user's movement. The top layer 10 may be made of: polyurethane; another suitable flexible material such as a woven or non woven polyester/polyurethane blend fabric made with nano fibers; or micro fibers with wicking properties; thermoplastic elastomer (TPE); natural rubber; synthetic rubber; or any combination thereof. The top layer 210 may also be treated with an antimicrobial agent. Examples of antimicrobial agents include silver based antimicrobial or 3-trimethoxy silyl propyl dimethyl octadecyl ammonium chloride, but other antimicrobial agents may also be employed. (It should be noted that any layer of any mat described herein may also be treated with an antimicrobial agent.) The top layer may also be made of a suitable material which can help the exercise mat 100 hold its shape, provide cushioning, provide flexibility, or provide support, or any combination thereof; or a material that bonds well with other exercise mat 100 layers; or any combination thereof. In one embodiment, the top layer 210 may be 0.35 to 0.95 millimeters thick, although this may vary in other embodiments to achieve different flexibility or cushioning requirements for the exercise mat 100.

The exercise mat 100 of the embodiment in FIG. 2 can have a middle layer 220. The middle layer 220 can provide structural integrity and cushioning for the exercise mat 100. The middle layer 220 may be made of, for example: a non-woven polyester cotton blended fabric; a 50% polyester 50% cotton blend; a woven or non woven fabric made of either 100% cotton or 100% polyester or a blend of cotton and polyester; thermoplastic elastomers; a polyvinyl chloride; polyurethane; a foam material made of natural rubber, synthetic rubber, or nylon spandex, or any combination thereof; a suitable material which can help the exercise mat 100 hold its shape, provide cushioning, provide flexibility, or provide support, or any combination thereof; or a material that bonds well with other exercise mat 100 layers; or any combination thereof. In some embodiments of the invention, the middle layer 220 may be 0.2-2.0 millimeters thick, although this may vary in other embodiments with different flexibility or cushioning requirements for the exercise mat 100.

Figure 3:
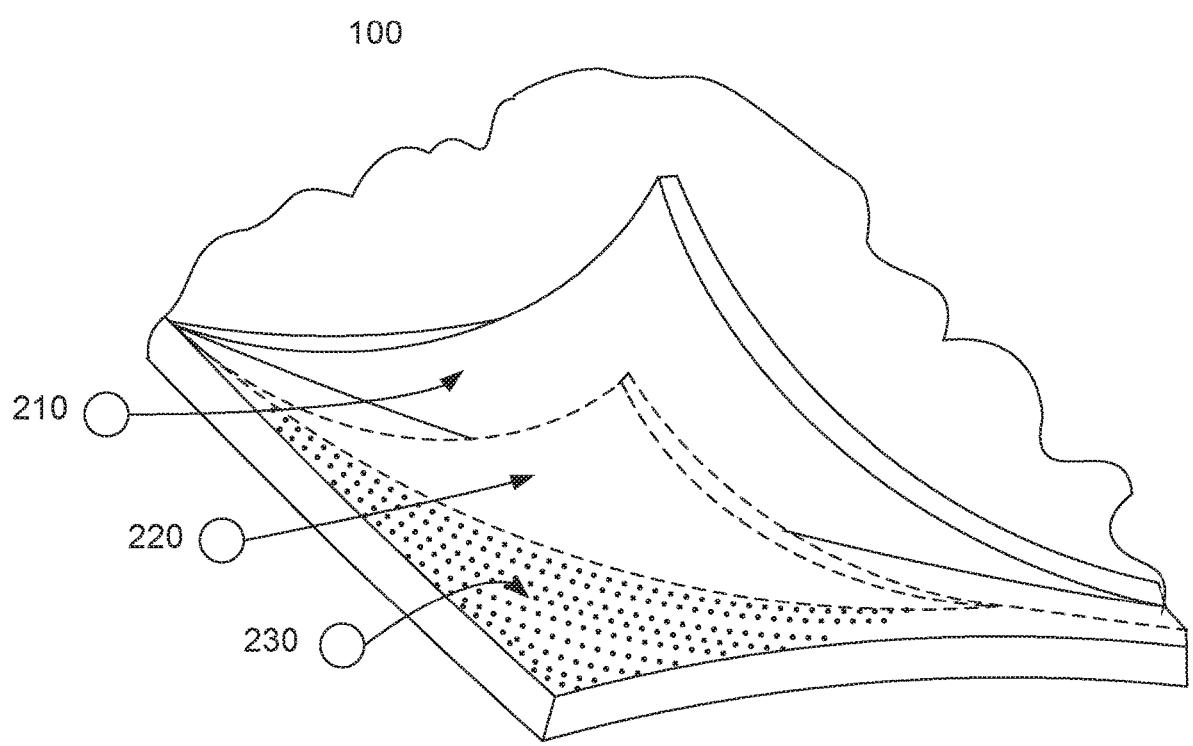

The exercise mat 100 of the embodiment in FIG. 2 can also have a bottom layer 230. This bottom layer 230 can provide friction and/or traction (e.g., in wet and/or dry conditions), so that when it is placed in contact with a floor by a user, the exercise mat 100 does not slide when the user utilizes the exercise mat 100 (e.g., for yoga or another exercise). The bottom layer 230 can also provide cushioning for a user of the exercise mat 100. In some embodiments, the bottom layer 230 may be provided with a textured surface to enhance grip. The bottom layer 230 may be made of a thermoplastic elastomer, polyvinyl chloride, polyurethane, natural rubber, synthetic rubber or another material which provides cushioning and/or grip, or any combination thereof. In other embodiments, the bottom layer 230 may be made of rubber, including natural rubber, synthetic rubber, or a blend of the two, or mix of natural rubber, synthetic rubber and thermoplastic elastomers as well as the above-mentioned materials, or any combination thereof. In some embodiments, the bottom layer may also be made of a suitable material which can help the exercise mat 100 hold its shape, provide cushioning, provide flexibility, provide wear and tear resistance, or provide support, or any combination thereof; or a material that bonds well with other exercise mat 100 layers; or any combination thereof. The bottom layer 230 may also be perforated (e.g., with punched holes as shown in FIG. 3) to allow moisture to pass through and for quick drying of exercise mat 100. (It should be noted that any layers described herein may also be perforated.) In one embodiment, the bottom layer 230 may be 1.5 to 5.5 millimeters thick, although this may vary in other embodiments with different flexibility or cushioning requirements for the exercise mat 100.

Note that the terms "top layer" and "bottom layer" in the embodiments above are used for ease of explanation only. Either the top layer 210 or the bottom layer 230 may be placed in contact with a floor by a user, with the opposite side forming an exercise surface for the user. This may allow a user to use different layer characteristics to enhance different exercises and/or to suit personal preferences. For example, a user may use the top layer 210, which may have moisture absorbing and/or antimicrobial properties, as an exercise surface when the user anticipates sweating. The user may use the bottom layer 230, which may have high friction and/or cushioning properties, as an exercise surface when the user does not anticipate sweating.

The various layers described above may be bonded to one another using any suitable bonding technique. In one embodiment, the layers may have thermoplastic bonding properties that cause adjacent layers to bond with one another when heated. In one example heat bonding process, liquid polyurethane may be cured on non woven fabric and rubber may be vulcanized on the other side of the non woven fabric at or near, for example, 180 degrees Celsius. In another bonding process, liquid polyurethane may be cured on non woven fabric and a thermoplastic elastomer may be glued to the other side of the non woven fabric with a non-toluene lamination adhesive (e.g., a non-toluene lamination adhesive, such as but not limited to 635NT) and/or other suitable adhesive. Alternatively, layers may be bonded using other adhesives and/or mechanical connections. In addition, any combination of these methods or any other method may be utilized.

In some embodiments, the exercise mat 100 can also be made by preparing a top layer and a bottom layer. The top layer is made by pouring a liquid form of polyurethane into a mold. The bottom layer may be made by passing a thermoplastic elastomer through a calendaring process (e.g., to be mixed and/or flattened) and/or a vulcanization process. The top layer and the bottom layer may then be passed through an oven so the thermoplastic elastomer laminates to the polyurethane to make the mat material. The mat material may then be rolled and/or cut into desired shape(s). The mat material and/or exercise mat 100 may be aired for a certain time period (e.g., to remove the rubber smell).

In some embodiments, the liquid form of polyurethane may be poured onto a middle layer comprising fabric (e.g., woven, non-woven), and the top layer, the middle layer, and the bottom layer may be passed through the oven so the thermoplastic elastomer laminates to the fabric.

VARIOUS EMBODIMENTS

The following embodiments are some of many embodiments that can be utilized.

In some embodiments, the exercise mat can comprise: at least one top layer, the at least one top layer comprising polyurethane; and at least one bottom layer adjacent to the at least one top layer, the at least one bottom layer comprising at least one thermoplastic elastomer. The exercise mat can also further comprise at least one middle layer disposed between the at least one top layer and the at least one bottom layer. Additionally, the at least one top layer of the exercise mat can also comprise: polyurethane; texture; at least one antimicrobial agent; or at least one open cell structure; or any combination thereof. The at least one middle layer of the exercise mat can also comprise: polyurethane; polyester nano fibers; polyester microfibers; non-woven fabric; at least one open cell structure; rubber foam material; woven fabric; cotton material; polyester material; at least one thermoplastic elastomer; polyvinyl chloride material; perforations; or at least one antimicrobial agent; or any combination thereof. The at least one bottom layer of the exercise mat can also comprise: texture; perforations; synthetic rubber; natural rubber; a polynivyl chloride, plyurethane, or at least one antimicrobial agent; or any combination thereof. Additionally, the at least top one layer is operable as an exercise surface and as a floor contact surface; and/or the at least one bottom layer is operable as an exercise surface and as a floor contact surface.

In other embodiments, the exercise mat can comprise: at least one top layer made of polyurethane and having at least one open cell structure, wherein the at least one top layer comprises at least one antimicrobial agent; at least one perforated bottom layer comprising at least one thermoplastic elastomer; and at least one middle layer comprising at least one woven polyester cotton blended fabric disposed between the at least one top layer and the at least one bottom layer. The at least one middle layer can also comprise: polyurethane; polyester nano fibers; polyester microfibers; non-woven fabric; woven fabric; at least one open cell structure; rubber foam material; cotton material; polyester material; cotton polyester blend material; at least one thermoplastic elastomer; polyvinyl chloride material; perforations; or at least one antimicrobial agent; or any combination thereof. The at least one bottom layer can comprises: texture; synthetic rubber; natural rubber; at least one antimicrobial agent; or any combination thereof. Additionally, the at least top one layer can be operable as an exercise surface and as a floor contact surface; and/or the at least one bottom layer can be operable as an exercise surface and as a floor contact surface.

In other embodiments, the exercise mat can comprise: at least one top layer, the at least one top layer comprising polyurethane; and at least one bottom layer adjacent to the at least one top layer, the at least one bottom layer comprising at least one synthetic rubber and at least one natural rubber. The exercise mat can further comprise at least one middle layer disposed between the at least one top layer and the at least one bottom layer. The at least one top layer can also comprise: at least one antimicrobial agent; or at least one open cell structure; or any combination thereof. The at least one middle layer can also comprise: polyurethane; polyester nano fibers; polyester microfibers; non-woven fabric; at least one open cell structure; rubber foam material; woven fabric; cotton material; polyester material; at least one thermoplastic elastomer; polyvinyl chloride material; perforations; or at least one antimicrobial agent; or any combination thereof. The at least one bottom layer can also comprise: texture; perforations; synthetic rubber; natural rubber; or at least one antimicrobial agent; or any combination thereof. The at least one top layer can be operable as an exercise surface and as a floor contact surface; and/or the at least one bottom layer can be operable as an exercise surface and as a floor contact surface.

In other embodiments, the exercise mat can comprise: at least one top layer having at least one open cell structure, wherein the at least one top layer comprises at least one antimicrobial agent; at least one perforated bottom layer comprising at least one thermoplastic elastomer; and at least one middle layer comprising at least one woven polyester cotton blended fabric disposed between the at least one top layer and the at least one bottom layer. The at least one middle layer can also comprise: polyurethane; polyester nano fibers; polyester microfibers; non-woven fabric; at least one open cell structure; rubber foam material; at least one thermoplastic elastomer; polyvinyl chloride material; perforations; or at least one antimicrobial agent; or any combination thereof. The at least one bottom layer can also comprise: texture; synthetic rubber; natural rubber; at least one antimicrobial agent; or any combination thereof. The at least top one layer can be operable as an exercise surface and as a floor contact surface; and/or the at least one bottom layer can be operable as an exercise surface and as a floor contact surface.

In some embodiments, a method for making an exercise mat can comprise: pouring at least one polyurethane layer; pouring at least one layer comprising synthetic rubber and natural rubber; and utilizing heat bonding to connect the at least one polyurethane layer and the at least one layer comprising synthetic rubber and natural rubber. The heat bonding can be done utilizing a continuous laminating process. Glue may not need to be utilized to connect the at least one polyurethane layer and the at least one layer comprising synthetic rubber and natural rubber. The at least one polyurethane layer can be cured on one side of non-woven fabric and the at least one layer comprising synthetic rubber and natural rubber can be vulcanized on an opposite side of the non-woven fabric. The vulcanization can be done at or near 180 Celsius.

In other embodiments, a method for making an exercise mat can comprise: pouring at least one polyurethane layer; pouring at least one thermoplastic layer; and utilizing at least one laminate to connect the at least one polyurethane layer and the at least one thermoplastic layer.

The at least one laminate can be at least one non-toluene lamination adhesive. The at least one polyurethane layer can be cured on one side of non-woven fabric and the at least one thermoplastic layer can be laminated on an opposite side of the non-woven fabric.

In some embodiments, a method for making an exercise mat can comprise: preparing at least one top layer comprising 'at least one liquid form of polyurethane, the at least one liquid form of polyurethane being poured into at least one mold; preparing at least one bottom layer comprising at least one thermoplastic elastomer, the at least one thermoplastic elastomer being passed through at least one calendaring process; and preparing the mat material by passing the at least one top layer and the at least one bottom layer through at least one oven so the at least one thermoplastic elastomer laminates to the at least one polyurethane. The at least one liquid form of polyurethane can be poured onto at least one middle layer comprising fabric, and the at least one top layer, the at least one middle layer, and the at least one bottom layer can be passed through the at least one oven so the at least one thermoplastic elastomer laminate to the fabric to make the mat material. The fabric can be woven or non-woven. The at least one thermoplastic elastomer can be passed through the at least one calendaring process in order to be mixed and/or flattened. The thermoplastic elastomer can vulcanize.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown.

Although the term "at least one" may often be used in the specification, claims and drawings, Applicant notes that the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An exercise mat comprising:
   at least one top layer comprising polyurethane having an open cell structure, wherein the at least one top layer is moisture absorbing or moisture wicking or both;
   at least one bottom layer comprising at least one rubber material; and
   at least one middle layer disposed between and bonded to the at least one top layer and the at least one bottom layer, wherein the at least one middle layer comprises at least one cotton fabric, or at least one polyester fabric, or both.

2. The exercise mat of claim 1, wherein the polyurethane is cured liquid polyurethane.

3. The exercise mat of claim 1, the at least one top layer further comprising:
   a textured surface to enhance grip;
   at least one antimicrobial agent; or
   a combination thereof.

4. The exercise mat of claim 1, the at least one middle layer further comprising:
   polyester nano fibers;
   polyester microfibers;
   non-woven fabric;
   woven fabric;
   cotton polyester blend material;
   at least one thermoplastic elastomer;
   polyvinyl chloride material;
   perforations; or
   at least one antimicrobial agent; or
   any combination thereof.

5. The exercise mat of claim 1, the at least one bottom layer further comprising:
   a textured surface to enhance grip;
   perforations;
   or
   at least one antimicrobial agent; or
   any combination thereof.

6. The exercise mat of claim 1, wherein:
   the at least one top layer forms an exercise surface and a floor contact surface; and/or
   the at least one bottom layer forms an exercise surface and a floor contact surface.

7. An exercise mat comprising:
   at least one top layer comprising polyurethane, wherein the at least one top layer is moisture absorbing, or moisture wicking, or both;
   at least one bottom layer comprising at least one synthetic rubber and at least one natural rubber; and at least one middle layer disposed between and bonded to the at least one top layer and the at least one bottom layer, the at least one middle layer comprising at least one fabric.

8. The exercise mat of claim 7, wherein the polyurethane is cured liquid polyurethane.

9. The exercise mat of claim 7, the at least one top layer further comprising:
at least one antimicrobial agent; or
at least one textured surface; or
a combination thereof.

10. The exercise mat of claim 7, the at least one middle layer further comprising:
polyurethane;
polyester nano fibers;
polyester microfibers;
non-woven fabric;
at least one open cell structure;
rubber foam material;
woven fabric;
cotton material;
polyester material;
at least one thermoplastic elastomer;
polyvinyl chloride material;
perforations; or
at least one antimicrobial agent; or
any combination thereof.

11. The exercise mat of claim 7, the at least one bottom layer further comprising:
a textured surface to enhance grip;
perforations; or
at least one antimicrobial agent; or
any combination thereof.

12. The exercise mat of claim 7, wherein:
the at least one top layer forms an exercise surface and a floor contact surface; and/or
the at least one bottom layer forms an exercise surface and a floor contact surface.

13. An exercise mat comprising:
at least one top layer comprising polyurethane, wherein the at least one top layer is moisture absorbing or moisture wicking or both;
at least one bottom layer comprising at least one thermoplastic material or at least one rubber material or both; and
at least one middle layer disposed between and bonded to the at least one top layer and the at least one bottom layer, wherein the at least one middle layer comprises at least one polyester fabric.

14. The exercise mat of claim 13, wherein the at least one polyester fabric comprises polyester nano fibers.

15. The exercise mat of claim 13, wherein the at least one polyester fabric comprises polyester microfibers.

16. The exercise mat of claim 13, wherein the at least one rubber material comprises synthetic rubber.

17. The exercise mat of claim 13, wherein the at least one middle layer comprises at least one rubber foam material.

18. The exercise mat of claim 13, wherein the at least one bottom layer comprises at least one thermoplastic elastomer.

19. The exercise mat of claim 13, wherein the polyurethane is cured liquid polyurethane.

* * * * *